United States Patent
Srinivas (10) Patent No.: US 10,481,940 B2
(45) Date of Patent: *Nov. 19, 2019

(54) POST-COPY BASED LIVE VIRTUAL MACHINE MIGRATION VIA SPECULATIVE EXECUTION AND PRE-PAGING

(71) Applicant: Google LLC, Mountain View, CA (US)

(72) Inventor: Venkatesh Srinivas, Seattle, WA (US)

(73) Assignee: Google LLC, Mountain View, CA (US)

(*) Notice: Subject to any disclaimer, the term of this patent is extended or adjusted under 35 U.S.C. 154(b) by 27 days.

This patent is subject to a terminal disclaimer.

(21) Appl. No.: 15/849,505

(22) Filed: Dec. 20, 2017

(65) Prior Publication Data

US 2018/0136963 A1    May 17, 2018

Related U.S. Application Data

(63) Continuation of application No. 15/178,937, filed on Jun. 10, 2016, now Pat. No. 9,880,872.

(51) Int. Cl.
*G06F 9/455* (2018.01)

(52) U.S. Cl.
CPC .. *G06F 9/45558* (2013.01); *G06F 2009/4557* (2013.01); *G06F 2009/45583* (2013.01); *G06F 2009/45595* (2013.01)

(58) Field of Classification Search
CPC ....... G06F 9/45558; G06F 2009/45595; G06F 2009/4557; G06F 2009/45583
See application file for complete search history.

(56) References Cited

U.S. PATENT DOCUMENTS

| | | | |
|---|---|---|---|
| 8,490,088 B2 | 7/2013 | Tang | |
| 8,799,494 B1* | 8/2014 | Ramzan | H04L 67/2847 709/231 |
| 8,903,888 B1* | 12/2014 | Hyser | G06F 9/45558 709/202 |

(Continued)

OTHER PUBLICATIONS

Hines et al., VEE '09 Proceedings of the 2009 ACM SIGPLAN/SIGOPS international conference on Virtual execution environments, pp. 51-60, Washington, DC, USA—Mar. 11-13, 2009 (Year: 2009).*

(Continued)

*Primary Examiner* — Benjamin C Wu (74) *Attorney, Agent, or Firm* — Honigman LLP (57) ABSTRACT

The method includes post copy migrating a guest virtual machine from a migration source host to a migration target host, executing the instruction stream of the guest virtual machine on the migration target host, and determining, by the migration target host, when the guest virtual machine encounters the page fault. When the guest virtual machine encounters the page fault, the method includes requesting, by the migration target host, the not-present page from the migration source host for loading on the migration target host, and emulating, on an emulator executing on or in communication with the migration target host, continued execution of the instruction stream of the guest virtual machine. The method also includes identifying, by the emulator, future page references to future pages from the emulated continued execution of the instruction stream, and requesting the future pages from the migration source host in parallel with the not-present page request.

18 Claims, 7 Drawing Sheets

(56) References Cited

U.S. PATENT DOCUMENTS

| | | | |
|---|---|---|---|
| 8,935,506 B1* | 1/2015 | Gopalan | G06F 12/1009 |
| | | | 711/202 |
| 9,086,981 B1* | 7/2015 | Tati | G06F 12/10 |
| 9,183,036 B2* | 11/2015 | Bacher | G06F 9/45558 |
| 9,454,400 B2* | 9/2016 | Tsirkin | G06F 12/10 |
| 9,459,902 B2* | 10/2016 | Noel | G06F 12/00 |
| 9,547,591 B1* | 1/2017 | Natanzon | G06F 12/08 |
| 9,710,386 B1* | 7/2017 | Zhang | G06F 12/00 |
| 9,710,401 B2* | 7/2017 | Rozas | G06F 12/1408 |
| 2004/0078541 A1* | 4/2004 | Lightstone | G06F 9/5016 |
| | | | 711/171 |
| 2005/0055541 A1* | 3/2005 | Aamodt | G06F 9/30101 |
| | | | 712/217 |
| 2005/0071601 A1* | 3/2005 | Luick | G06F 12/0862 |
| | | | 711/206 |
| 2006/0095679 A1* | 5/2006 | Edirisooriya | G06F 12/0862 |
| | | | 711/137 |
| 2006/0149935 A1* | 7/2006 | Eickemeyer | G06F 9/3804 |
| | | | 712/219 |
| 2009/0199219 A1* | 8/2009 | Rofougaran | G06F 9/441 |
| | | | 719/330 |
| 2010/0005272 A1* | 1/2010 | Vuletic | G06F 9/3877 |
| | | | 711/213 |
| 2010/0199045 A1* | 8/2010 | Bell | G06F 12/0875 |
| | | | 711/137 |
| 2014/0196037 A1* | 7/2014 | Gopalan | G06F 9/4856 |
| | | | 718/1 |
| 2014/0297780 A1* | 10/2014 | Zhou | H04L 67/2847 |
| | | | 709/216 |
| 2015/0052322 A1 | 2/2015 | Tsirkin et al. | |
| 2015/0149439 A1* | 5/2015 | Idei | G06F 16/25 |
| | | | 707/718 |
| 2015/0229717 A1* | 8/2015 | Gupta | H04L 67/34 |
| | | | 718/1 |
| 2016/0197986 A1* | 7/2016 | Chambliss | G06F 9/45558 |
| | | | 709/213 |
| 2017/0139637 A1* | 5/2017 | Roozbeh | G06F 9/46 |

OTHER PUBLICATIONS

S. Sahni and V. Varma, "A Hybrid Approach to Live Migration of Virtual Machines," 2012 IEEE International Conference on Cloud Computing in Emerging Markets (CCEM), Bangalore, 2012, pp. 1-5 (Year: 2012).*

G. Singh and P. Gupta, "A review on migration techniques and challenges in live virtual machine migration," 2016 5th International Conference on Reliability, Infocom Technologies and Optimization (Trends and Future Directions) (ICRITO), Noida, 2016, pp. 542-546 (Year: 2016).*

James Dundas and Trevor Mudge, Improving Data Cache Performance by Pre-Executing Instructions Under a Cache Miss, Proc. 1997 ACM Int. Conf. on Supercomputing, Jul. 1997.

Michael R Hines et al "Post-Copy based line virtual machine migration using adaptive pre-paging and dynamic self-ballooning" pp. 51-60, Mar. 11, 2009.

Kashyap Sanidhya et al: "RLC—A Reliable Approach to Fast and Efficient Live Migration of Virtual Machines in the Clouds" pp. 360-367, Jun. 27, 2014.

International Search Report and Written Opinion for the related PCT Application No. PCT/2017/032617 dated Aug. 16, 2017.

* cited by examiner

POST-COPY BASED LIVE VIRTUAL MACHINE MIGRATION VIA SPECULATIVE EXECUTION AND PRE-PAGING

CROSS REFERENCE TO RELATED APPLICATIONS

This U.S. patent application is a continuation of, and claims priority under 35 U.S.C. § 120 from, U.S. patent application Ser. No. 15/178,937, filed on Jun. 10, 2016, which is hereby incorporated by reference in its entirety.

TECHNICAL FIELD

This disclosure relates to speculative virtual machine execution.

BACKGROUND

Web services may operate virtual machines on servers. Each server may host multiple virtual machines existing and operating as independent machines within the server. Moreover, each virtual machine may contain one or more virtual central processing units (vCPUs). When a server needs maintenance or degrades for other reasons, the virtual machine may be transferred to a different server. A live migration may be performed to transfer the virtual machine to the different server. The live-migration generally quiets or suspends a virtual machine on the current server and copies or transfers the virtual machine to the different server. The different server then resumes the virtual machine and continues operations. The live-migration requires the operation of the virtual machine to be quieted or suspended while the copying or transfer is occurring. The delay created by quieting or suspension of the virtual machine may be unacceptable to virtual machine operations. It therefore may be desirable to transfer a virtual machine to another server quickly and without downtime.

SUMMARY

One aspect of the disclosure provides a method for speculative VM execution. The method includes post-copy migrating a guest virtual machine from a migration source host to a migration target host. The guest virtual machine has an instruction stream of instructions. The method further includes executing the instruction stream of the guest virtual machine on the migration target host and determining, by the migration target host, when the guest virtual machine encounters the page fault. The guest virtual machine stalls execution of the instruction stream when the guest virtual machine encounters a page fault for a page reference in the instruction stream to a not-present page. The not-present page is resident on the migration source host and not resident on the migration target host. When the guest virtual machine encounters the page fault, the method includes requesting, by the migration target host, the not-present page from the migration source host for loading on the migration target host and emulating, on an emulator executing on or in communication with the migration target host, continued execution of the instruction stream of the guest virtual machine. The method also includes identifying, by the emulator, future page references to future pages from the emulated continued execution of the instruction stream and requesting, by the migration target host, the future pages from the migration source host in parallel with the not-present page request, so as to prefetch the future pages to the migration target host while loading the not-present page on the migration target host.

Implementations of the disclosure may include one or more of the following optional features. In some implementations, the method includes requesting the future pages from the migration source host as the corresponding future page references are identified. While emulating the continued execution of the instruction stream of the guest virtual machine, the method includes setting aside instructions that are dependent on loaded values of the not-present page, allowing the emulator to identify future page references beyond future page faults.

The migration target host may include one or more computing devices and one or more memory hosts in communication with the one or more computing devices. The one or more memory hosts store pages. The method may also include identifying the future page references based on a relationship between the future page references and the not-present page. The relationship may include a page navigation map between a parent page and one or more child pages. In some examples, identifying the future page references includes identifying at least one additional future page reference in at least one instruction associated with an identified future page reference. The method also includes ceasing emulation of the continued execution of the instruction stream by the emulator when the non-present page has been delivered to the migration target host. The method further includes continuing execution of the instruction stream of the guest virtual machine on the migration target host when the not-present page is resident on the migration target host. Identifying future page references from the emulated continued execution of the instruction stream further may include identifying a future page address of the identified future page references.

Another aspect of the disclosure provides a migration target host including data processing hardware and memory hardware in communication with the data processing hardware. The memory hardware stores instructions that when executed on the data processing hardware cause the data processing hardware to perform operations. The operations include post-copy migrating a guest virtual machine from a migration source host to the memory hardware. The guest virtual machine has an instruction stream of instructions. The operations further include executing the instruction stream of the guest virtual machine and determining when the guest virtual machine encounters the page fault. The guest virtual machine stalls execution of the instruction stream when the guest virtual machine encounters a page fault for a page reference in the instruction stream to a not-present page, the not-present page being resident on the migration source host and not resident on the memory hardware of the migration target host. When the guest virtual machine encounters the page fault, the operations include requesting the not-present page from the migration source host for loading on the memory hardware of the migration target host and emulating, on an emulator executing on the data processing hardware or in communication with the migration target host, continued execution of the instruction stream of the guest virtual machine. The operations also include identifying, by the emulator, future page references to future pages from the emulated continued execution of the instruction stream and requesting the future pages from the migration source host in parallel with the not-present page request, so as to prefetch the future pages to the memory hardware of the migration target host while loading the not-present page on the memory hardware of the migration target host.

This aspect may include one or more of the following optional features. In some implementations, the operations include requesting the future pages from the migration source host as the corresponding future page references are identified. The operations may also include, while emulating the continued execution of the instruction stream of the guest virtual machine, setting aside instructions that are dependent on loaded values of the not-present page, allowing the emulator to identify future page references beyond future page faults. The memory hardware may further include one or more memory hosts in communication with the data processing hardware, the one or more memory hosts storing pages. In some examples, the operations include identifying the future page references based on a relationship between the future page reference and the not-present page. The relationship may include a page navigation map between a parent page and one or more child pages.

In some implementations, the operation of identifying the future page references includes identifying at least one future page reference in at least one instruction associated with an identified future page reference. The operations may also include ceasing emulation of the continued execution of the instruction stream by the emulator when the non-present page has been delivered to the memory hardware of the migration target host. The operations may further include continuing execution of the instruction stream of the guest virtual machine when the not-present page is resident on the memory hardware of the migration target host. Identifying future page references from the emulated continued execution of the instruction stream may further include identifying a future page address of the identified future page references.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

While migrating virtual machines (e.g., guest vCPUs) from a migration source host to a migration target host using post-copy migration, only a physical static state and a minimal dynamic state (e.g., register state) transfers while a guest vCPU is quiescent. As a result, when a virtual machine resumes on the migration target host, guest page references result in a not-present fault (because the guest pages have not yet been loaded on that new host—the migration target host). When the guest vCPU encounters the not-present page fault, the guest vCPU stalls execution of the instruction stream while requesting the not-present page from the migration source host and waiting for the migration target host to load the not-present page. To satisfy/remedy the fault, the migration target host requests transfer of the pages from the migration source to the migration target on-demand. While the guest vCPU stalls from a not-present page fault, an emulator may continue execution of the instructions stream by the guest vCPU to extract future page references from the instruction stream and request the extracted future page references from the migration source host as they are discovered, in parallel with the not-present page—so as to prefetch the identified page references to the migration target host, while loading the not-present page on the migration target host.

Figure 1:
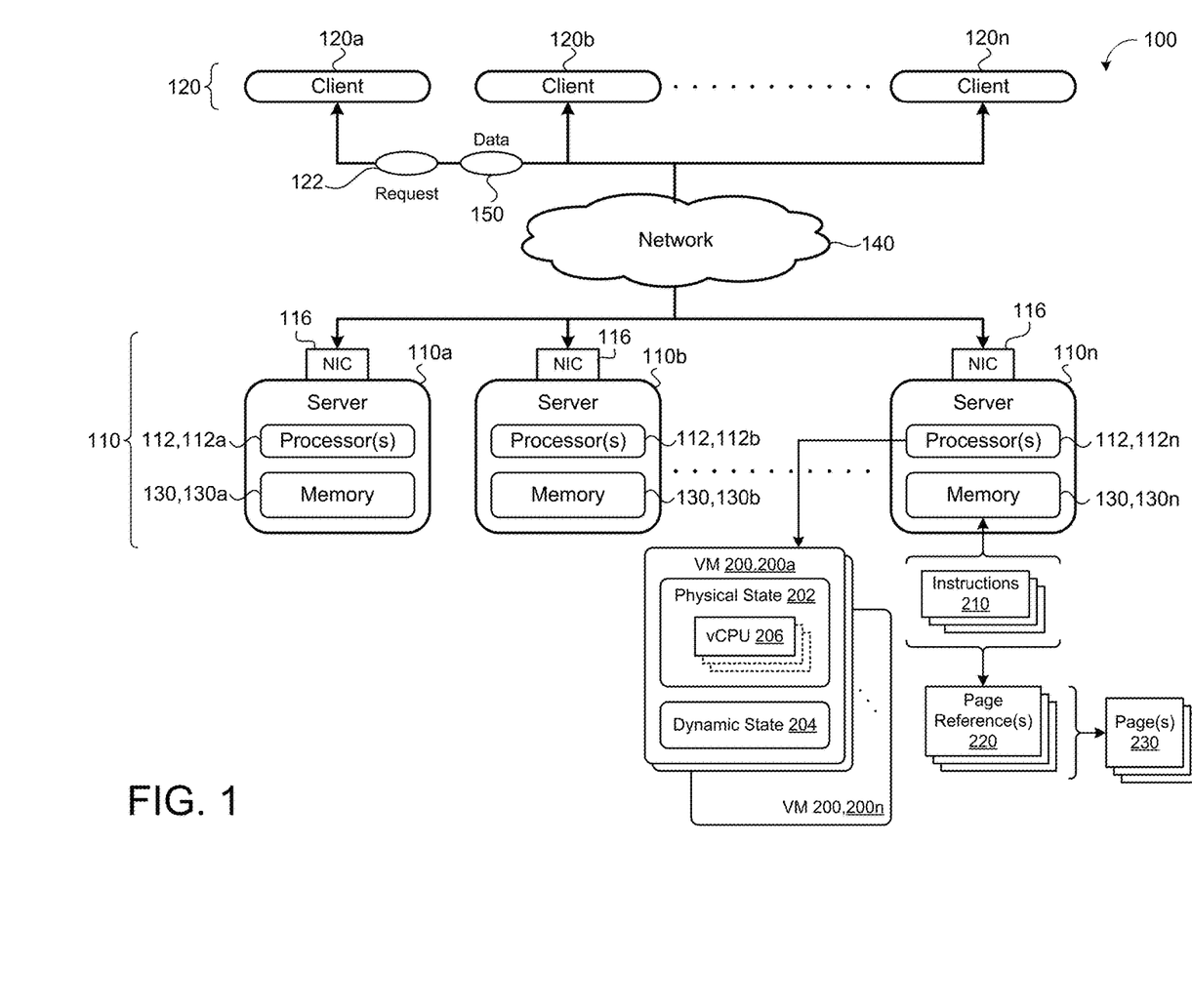
FIG. 1 is a schematic view of a distributed system having memory hosts.

FIG. 1 is a schematic overview of a distributed system 100 with servers or hosts 110. Each of the one or more servers or hosts 110, 110a, 110b . . . 110n includes data processing hardware 112 (e.g., one or more computer processors) and memory hardware 130 in communication with the data processing hardware 112. Each host 110 includes a network interface connection (NIC) 116 configured for communication with other hosts 110 or with one or more clients 120 via a network 140 (e.g., via the Internet).

In some implementations, one or more hosts 110 provide a virtual machine 200 by executing corresponding instructions 210 stored in the corresponding memory hardware 130. The instructions 210 may be part of an instruct stream received by the one or more hosts 110, 110a, . . . 110n. The virtual machine 200 may be an emulation of a particular computer system. Moreover, the virtual machine 200 may operate based on a specific computer architecture and one or more functions of a real or hypothetical computer, and its implementation may involve specialized hardware, software, or a combination thereof. In some examples, the virtual machine 200 is a system virtual machine; while in other examples, the virtual machine 200 is a process virtual machine.

The system virtual machine (also known as a full virtualization VM) provides a complete substitute for a targeted real machine and a level of functionality that allows execution of a complete operating system. The system virtual machine usually emulates an existing architecture and is built with the purpose of: i) providing a platform to run programs where the real hardware is not available for use (e.g., executing on otherwise obsolete platforms); ii) providing multiple instances of virtual machines leading to more efficient use of computing resources (e.g., to provide hardware virtualization); or iii) both. A hypervisor may share and manage hardware to execute different environments in isolation from each other on the same physical machine.

The process virtual machine executes a single computer program by providing an abstracted and platform-independent program execution environment. In some examples, the process virtual machine emulates different architectures and allows execution of software applications and operating systems written for another CPU or architecture.

Each virtual machine 200 includes a physical state 202 and a dynamic state 204. The physical state 202 represents a number of vCPUs 206, virtual PCI slots, virtual devices in PCI slots, and/or other computer equipment. In some implementations, the virtual machine 200 has one associated vCPU 206; while in other implementations, the virtual machine 200 has a plurality of associated vCPUs 206 when the physical host 110 has multiple CPU cores at its disposal. In such implementations, a CPU scheduler may assign execution contexts and the vCPU essentially becomes a series of time slots on logical processors. The dynamic state 204 represents contents of virtual CPU registers, contents of guest memory, etc. necessary for the virtual machine 200 to operate and emulate a computing machine.

The instructions 210 may include page references 220, which are commands to interact with clients 120 or data sources to access data or information contained within pages 230. The instructions 210 may be representative of the one or more vCPUs 206. Moreover, the instructions 210 executed by the data processing hardware 112 may be the same as those of the one or more vCPUs 206. In at least one implementation, the instructions 210 are x86 commands. In at least one other implementation, the instructions 210 are any series of commands for execution by the data processing hardware 112.

The pages 230 may be quite large, e.g., exceeding 208 Gb, and larger implementations are possible as well. For example, a client 120 may send a request 122 for information or data 150 to a virtual machine 200 through the network 140. The NIC 116 receives the request at the appropriate host 110. The data processing hardware 112 of the host 110 directs the request to the correct virtual machine 200 located in the memory 130 of the host 110. The data processing hardware 112 of the host 110 then accesses the instructions 210 to perform the appropriate processing for the request 122 as the virtual machine 200 would, according to the physical state(s) 202 and dynamic state(s) 204 of the virtual machine 200. The data processing hardware 112 may access various pages 230 containing data 150. The data processing hardware 112 determines the appropriate data 150 from the pages 230 and returns the data 150 or entire page 230 to the client 120. In some examples, multiple clients 120, 120a, 120b . . . 110n access multiple hosts 110, 110a, 110b . . . 110n simultaneously with each host 110, 110a, 110b . . . 110n operating one more virtual machines 200, 200a, 200b . . . 200n.

Figure 2A:
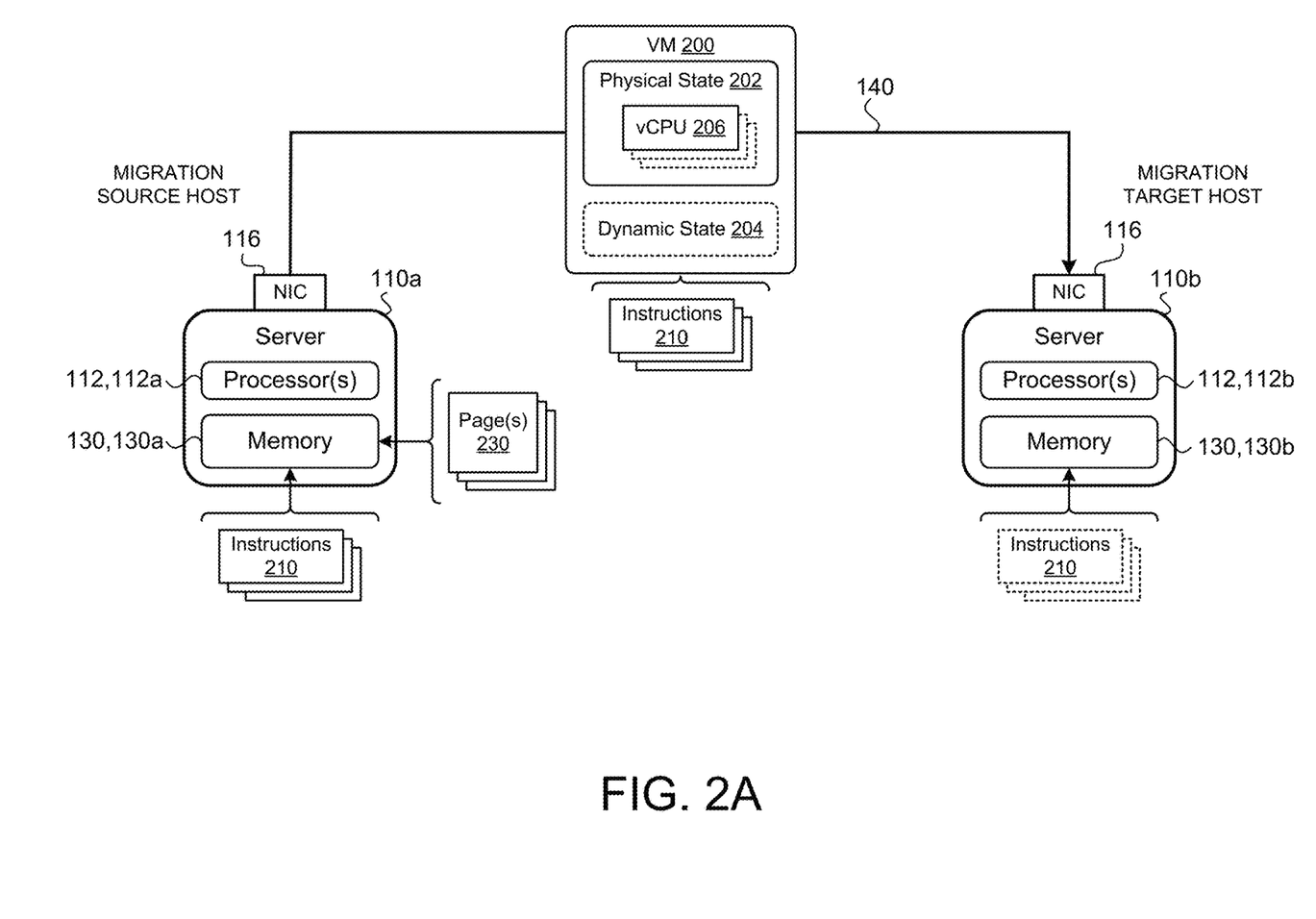
FIG. 2A is a schematic view of a virtual machine being transferred from a migration source host to a migration target host.

FIG. 2A is a schematic view of a virtual machine 200 being transferred from a migration source host 110, 110a to a migration target host 110, 110b. For various reasons, the virtual machine 200 may need to be migrated from the migration source host 110, 110a to the migration target host 110, 110b. A post-copy migration may be used. In such implementations, the migration source host 110, 110 transfers or post-copies only the physical state 202, minimal dynamic state 204 (e.g., register state), and part or all of the instructions 210 associated with the virtual machine 200 to the migration target host 110, 110b while the virtual machine 200 is quiescent. In some examples, the migration source host 110, 110a transfers the physical state 202, optionally some of the dynamic state 204, and part or all of the instructions 210 associated with the virtual machine 200 via the NIC 116 over the network 140. The migration target host 110, 110b receives the physical state 202, any dynamic state 204, and part or all of the instructions 210 associated with the virtual machine 200 via the NIC 116 over the network 140. The post-copy migration transfers a minimal amount of information of the virtual machine 200 and may be used to minimize the down time of the virtual machine 200. Waiting for all of the pages 230 to be transferred to the migration target host 110, 110b may result in unacceptable down time for the virtual machine 200. The migration source host 110, 110a may retain pages 230 and transfer the pages 230 on an as-needed basis to the migration target host 110, 110b. The migration target host 110, 110b loads the physical state 202, the dynamic state 204, and part or all of the instructions 210 associated with the virtual machine 200 into its memory 130, 130b. The data processing hardware 112, 112b may begin executing the instructions 210 in an instruction stream format including instructions or requests requiring access to given pages 230.

Figure 2B:
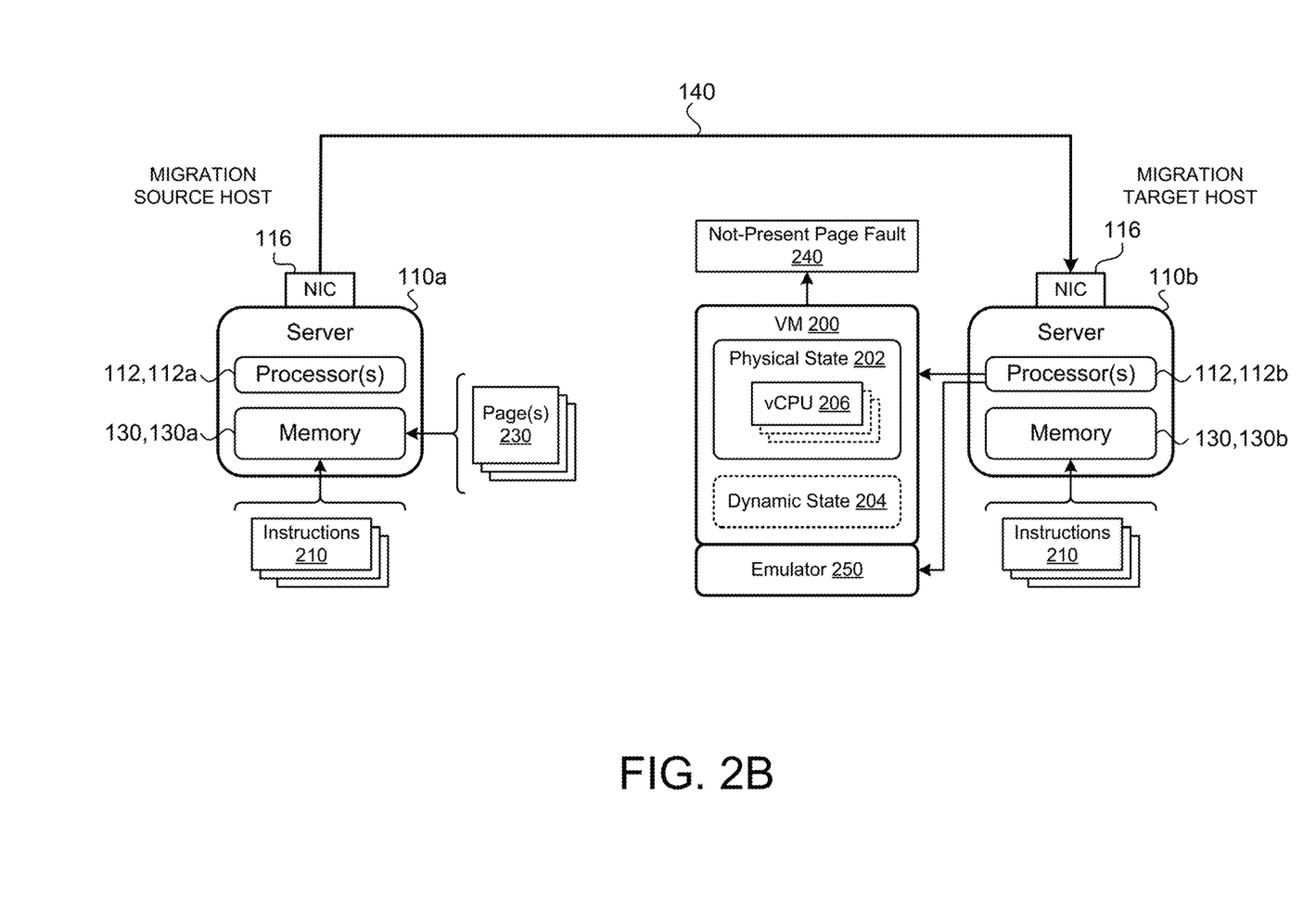
FIG. 2B is a schematic view of the virtual machine in the process of being transferred from the migration source host to the migration target host.

FIG. 2B is a schematic view of the virtual machine 200 in the process of being transferred from the migration source host 110, 110a to the migration target host 110, 110b. The data processing hardware 112, 112b of the migration target host 110, 110b may begin to execute the instructions 210 to operate the virtual machine 200a acting as a vCPU 206. Many instructions 210 may require access to a given page 230. As the data processing hardware 112 encounters an instruction 210 requiring a page 230 that has not been transferred from the migration source host 110, 110a, the data processing hardware 112 raises a not-present page fault 240. A not-present page fault 240 stalls execution of the instructions 210 until the corresponding page 230, 230a may be retrieved, acting as a stalled vCPU 206. Following the not-present page fault 240, the migration target host 110, 110b executes an emulator 250 that examines or executes the instructions 210 to identify future pages 230, 230b that the data processing hardware 112 may access after the not-present page fault 240 has been cleared by receiving the not-present page 230 on the migration target host 110, 110b. In some examples, the emulator 250 continues execution of the instructions 210 and the emulator 250 sets aside any pages 230 or values that are not-present and continues to identify pages 230, 230b that may be called or needed next by the instruction 210. The emulator 250 may also examine the pages 230 directly to determine, based on relationships, which pages 230, 230b the data processing hardware 112 or vCPU 206 needs to prevent more not-present page faults 240. The emulator 250 may examine, including but not limited to, the frequency of past uses between pages 230, common address locations, memory access requirements, embedded linking, or other relationships between the pages 230 to determine references to future pages 230, 230b. In some examples, the page references 220 to future pages 230, 230b include a page navigation map between a parent page 230 and one or more child pages 230.

Figure 2C:
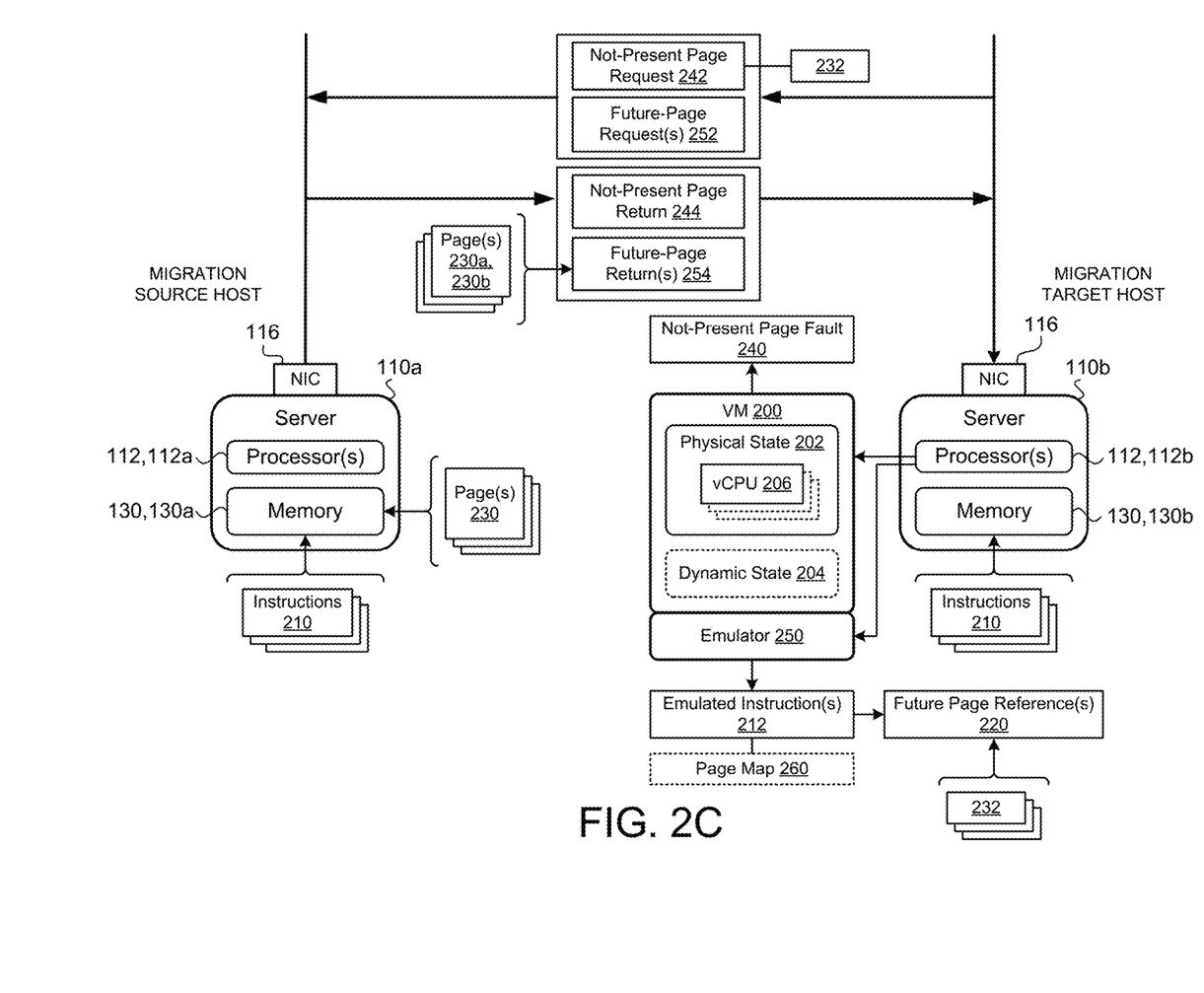
FIG. 2C is a schematic view of the virtual machine in the process of being transferred from the migration source host to the migration target host and retrieving pages.

FIG. 2C is a schematic view of the virtual machine 200 in the process of being transferred from the migration source host 110, 110a to the migration target host 110, 110b and retrieving pages 230. As the virtual machine 200, executing on the data processing hardware 112, 112b of the migration target host 110, 110b, remains stalled from the not-present page fault 240, the data processing hardware 112, 112b may send a not-present page request 242 for a not-present page 230a located at an address 232. The emulator 250 remains running during the not-present page request 242 for the not-present page 230a using the data processing hardware 112, 112b. The address 232 identifies the specific page 230 that may be generating the not-present page fault 240. The migration target host 110, 110b delivers the not-present page request 242 to the migration source host 110, 110a or other host 110 containing the not-present page 230a. The migration source host 110, 110a may retrieve and deliver the not-present page 230a to the migration target host 110, 110b via a not-present page return 244. The not-present page return 244 returns the not-present page 230, 230a to migration target host 110, 110*b*, allowing the migration target host 110, 110*b* to clear the not-present page fault 240.

While the not-present page request 242 is being sent and returned, the emulator 250 commences continued execution of the instructions 210 from the point where the not-present page fault 240 occurred, acting as the vCPU 206. The emulator 250 emulates the continued execution of the instructions 210 by stepping though the next instructions 210 the data processing hardware 112, 112*b* may execute and identifies future page references 220 to future pages 230, 230*b* based on emulated instructions 212. The data processing hardware 112 may use other references to identify pages 230 as well. Moreover, the future page references 220 may include addresses 232 or other references to identify pages 230. As the emulator 250 emulates the continued execution of the instructions 210 and identifies the future page references 220, the emulator 250 generates future-page requests 252 for the future pages 230, 230*b* corresponding to the identified future page references 220 and optionally determines what may be necessary (e.g., other resources) for continued future execution of the instructions 210 based on the emulated instructions 212. While emulating the instructions 210, the emulator 250 may set aside instructions 210 that reference not-present pages 230*a* and continue to identify future page references 220. The migration target host 110, 110*b* may send one or more future-page requests 252 for the future pages 230*b* corresponding to the future page references 220 discovered from the emulated instructions 212 in parallel with the not-present page request 242 for the not-present page 230*a* that generated the not-present page fault 240.

In response to receiving the one or more future-page requests 252, the migration source host 110, 110*a* sends one or more corresponding future-page returns 254 including the requested future pages 230, 230*b* to the migration target host 110, 110*b*. The not-present page request 242, the not-present page return 244, the future-page request(s) 252, and the future-page return 254 may occur in similar and/or overlapping time frames. This allows the migration source host 110, 110*a* to fully or partially transfer multiple pages 230 to the migration target host 110, 110*b*, reducing future occurrences of the not-present page fault 240 and associated stoppages of the execution of the instructions 210 for the vCPU 206. In some examples, the data processing hardware 112 suspends the emulator 250 upon return of the not-present page 230, 230*a* via the not-present page return 244. The migration source host 110, 110*a* may continue to fulfill the future-page request(s) 252 and send the future-page returns 254 to the migration target host 110, 110*b*, even when the emulator 250 has been stopped. In some instances, the emulator 250 incorrectly identifies future page references 220 from the emulated instructions 212 and generates corresponding future-page requests 252 for the future pages 230*b* corresponding to the incorrectly identified future page references 220, resulting in the corresponding future pages 230, 230*b* being pre-fetched. Such instances may be acceptable, as the data processing hardware 112 may later use the future pages 230, 230*b* of the incorrectly identified future page references 220 in later continued execution of the instructions 210.

Figure 2D:
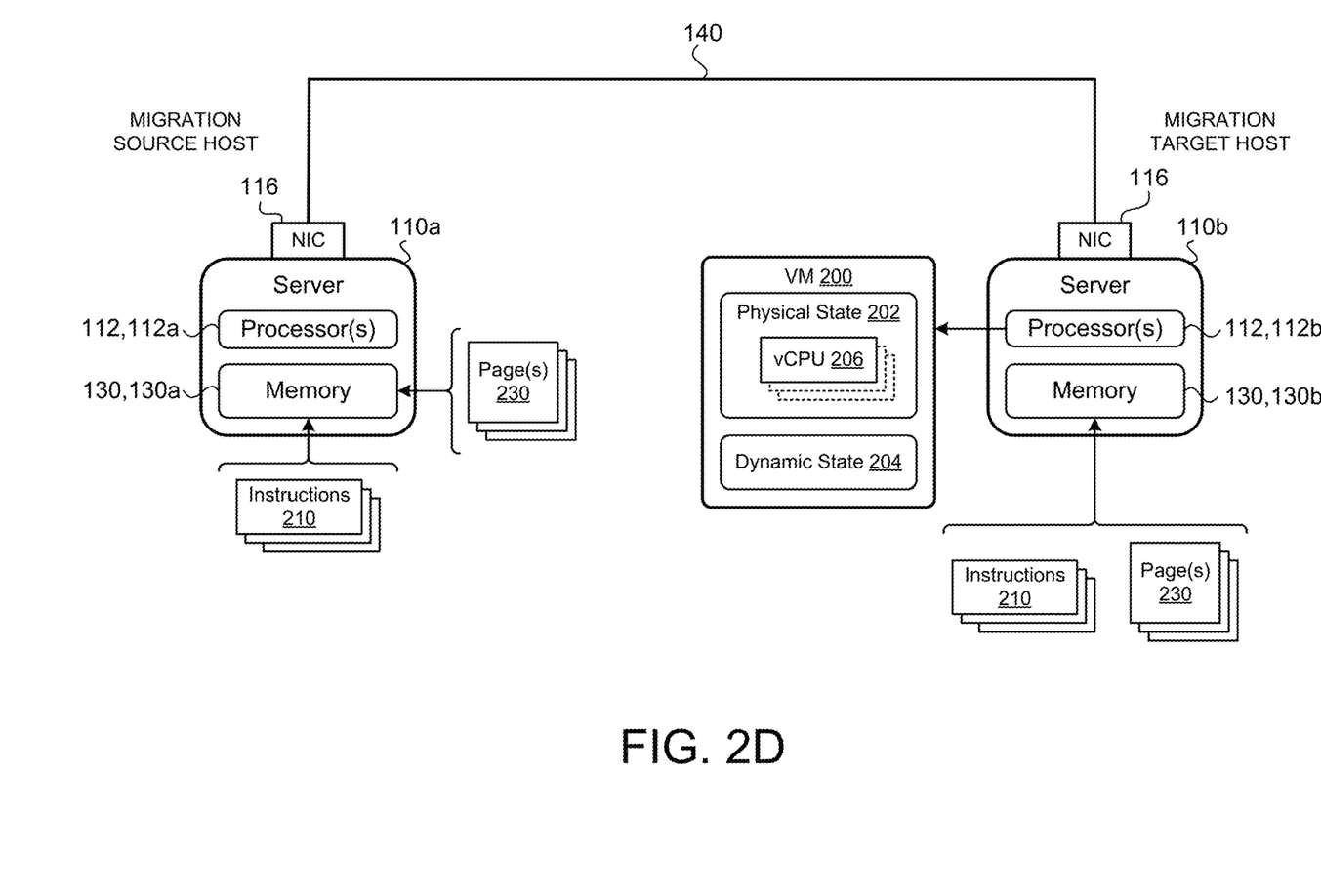
FIG. 2D is a schematic view of the virtual machine after the requested pages have been transferred from the migration source host to the migration target host.

FIG. 2D is a schematic view of the virtual machine 200 after the requested pages 230 have been transferred from the migration source host 110, 110*a* to the migration target host 110, 110*b*. The emulator 250 may be stopped or suspended when the not-present page 230, 230*a* has been returned and loaded in the memory 130, 130*b* of the migration target host 110, 110*b*, resulting in the virtual machine 200 having access as needed to continue operations of the vCPU 206 via the data processing hardware 112, 112*b*. The migration target host 110, 110*b* may clear the not-present page fault 240 (via the vCPU 206), allowing the vCPU 206 on the migration target host 110, 110*b* to continue executing the instructions 210 and operating the virtual machine 200 on the migration target host 110, 110*b*. The continued generation of not-present page faults 240 and the retrieval of pages 230 may continue until the necessary pages 230 referenced by the instructions 210 have been transferred from the migration source host 110, 110*a* to the migration target host 110, 110*b*. Once all of the pages 230 referenced by the instructions 210 are resident on the migration target host 110, 110*b*, the migration target host 110, 110*b* can execute the instructions 210, via the data processing hardware 112, 112*b*, to provide the virtual machine 200 without any further not-present page faults 240. The fully-transferred virtual machine 200 has a complete physical state 202 and dynamic state 204.

Figure 3:
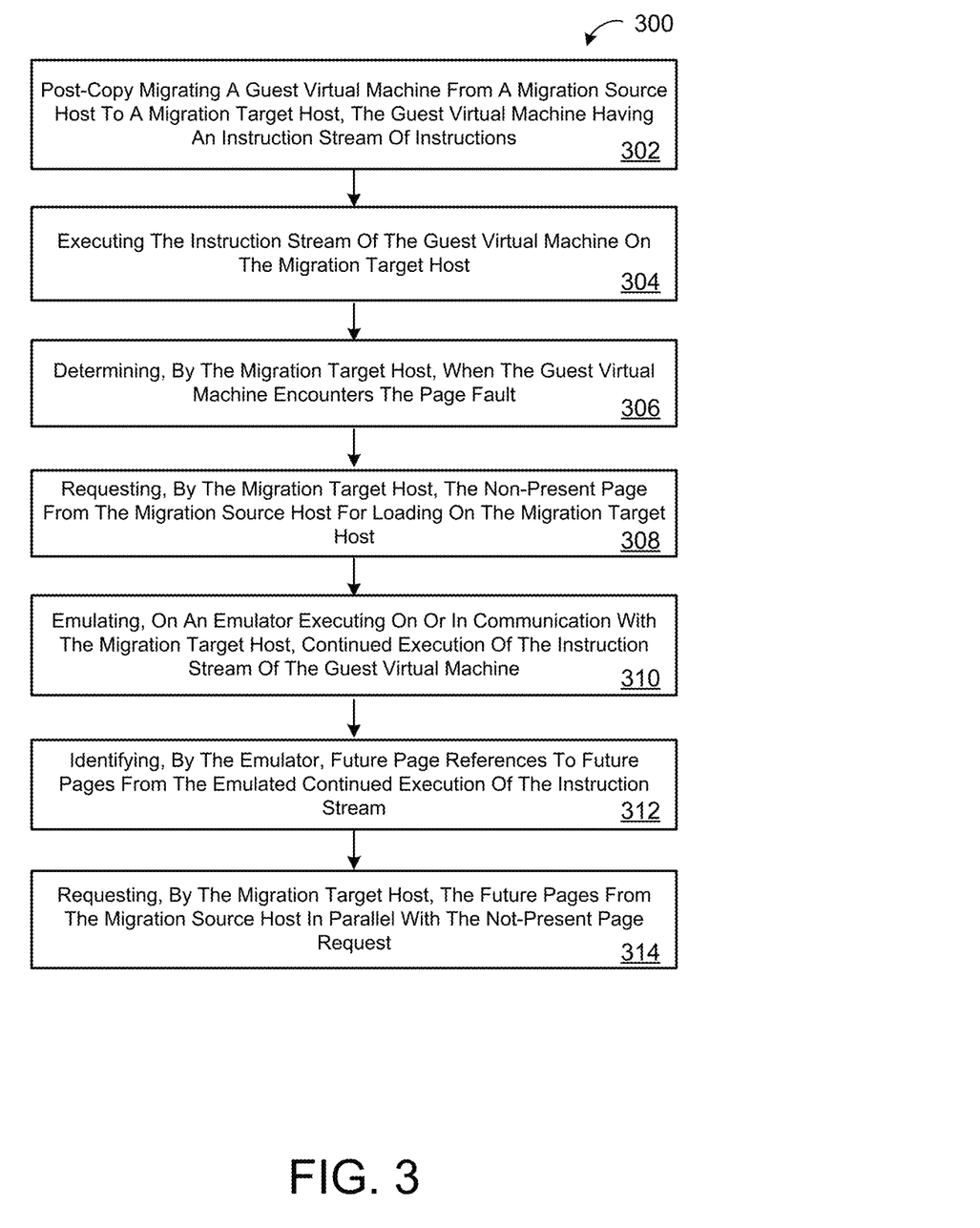
FIG. 3 is an example arrangement of operations for a method of speculative virtual machine execution.

FIG. 3 provides an example arrangement of operations for a method 300 of speculative virtual machine execution. At block 302, the method 300 includes post-copy migrating a guest virtual machine 200 from a migration source host 110,110*a* to a migration target host 110,110*b*. Each virtual machine 200 may include a physical state 202, representing the number of virtual CPUs 206, PCI slots, devices in PCI slots, etc., and a dynamic state 204 including contents of virtual CPU registers, contents of guest memory, etc. necessary for the virtual machine to operate. Each virtual machine 200 has a set of instructions 210 that reference various pages 230. A network 140 may transfer the virtual machine 200, including its physical state 202 and dynamic state 204, from the migration source host 110,110*a* to the migration target host 110,110*b*. At block 304, the method 300 includes executing the instructions 210 of the guest virtual machine 200 on the migration target host 110, 110*b*. The data processing hardware 112, 112*b* of the migration target host 110, 110*b* may execute the instructions 210 to provide a virtual machine 200 having at least one associated vCPU 206. The guest virtual machine 200 may stall execution of the instruction stream of instructions 210 when the guest virtual machine 200 encounters a page fault 240 for a page reference or address 232 to a page 230 in the instruction stream of instructions 210 to a not-present page 230, 230*a*. The not-present page 230, 230*a* may be resident on the migration source host 110, 110*a* and not resident on the migration target host 110, 110*b*. At block 306, the method 300 may include determining, by the migration target host 110, 110*b*, when the guest virtual machine 200 encounters the page fault 240. The data processing hardware 112 of the migration target host 110, 110*b* may encounter a not-present page fault 240 when a page 230 required for continued execution of the instructions 210 is not-present in the memory 130, 130*b* of the migration target host 110, 110*b*. When the guest virtual machine 200 encounters the page fault 240, the method 300 may include the following. At block 308, the method 300 includes requesting, by the migration target host 110, 110*b*, the not-present page 230, 230*a* from the migration source host 110, 110*a* for loading on the migration target host 110, 110*b*. The not-present page 230, 230 may be requested by a request for a not-present page 242 including an address 232 of the not-present page 230, 230*a*. At block 310, the method 300 may include emulating, on an emulator 250 executing on or in communication with the migration target host 110, 110*b*, continued execution of the instruction stream of the instructions 210 of the guest virtual machine 200. The emulator 250 may continue to emulate the continued execution of the instructions 210 by processing the instructions 210. The emulator 250 may act as the stalled virtual machine 200 (and/or vCPU 206) stepping past the not-present page fault 240 and continuing to examine instructions 210 to determine which pages 230 may be required by the virtual machine 200 (and/or vCPU 206) after the not-present page fault 240. At block 312, the method 300 may include identifying, by the emulator 250, future page references 220 from the emulated continued execution or emulated instructions 212 of the instruction stream of instructions 210. The emulated instructions 212 may identify future page references 220 by examination of the instructions 210 and setting aside values needed by pages 230 to determine what pages 230 the instructions 210 may later require for continued execution thereof. In some examples, the emulator 250 examines the relationships of pages 230 to the not-present page 230, 230a to identify future page references 220 to future pages 230, 230b. At block 314, the method 300 may include requesting, by the migration target host 110, 110b, the future pages 230, 230b from the migration source host 110, 110a in parallel with the request for not-present page 242, so as to prefetch the future pages 230, 230b to the migration target host 110, 110b, while loading the not-present page 230, 230a on the migration target host 110, 110b. The identified future page reference 220 may include an address 232 identifying specific future page 230b. The migration source host 110, 110a may partially or fully transfer the identified future page 230b to the migration target host 110, 110b via the future-page return 254. The not-present page return 244 may return the not-present page 230, 230a. The not-present page return 244 and the future-page return 254 may operate in parallel.

In some implementations, the method 300 includes requesting the future pages 230, 230b from the migration source host 110, 110b, via future-page request 252, as the emulator 250 identifies the corresponding future page references 220. One or more future-page requests 252 may be in progress during the not-present page request 242 and the not-present page return 244. While emulating the continued execution of the instruction stream of instructions 210 of the guest virtual machine 200, the method 300 may include setting aside instructions 210 that are dependent on loaded values of the not-present page 230, 230a, allowing the emulator 250 to identify future page references 220 beyond future page faults or not-present page faults 240.

The migration target host 110, 110b may include one or more computing devices 400 or processors 112, and one or more memory hosts or memory 130 in communication with the one or more computing devices 400 or processors 112, the one or more memory hosts or memory 130 storing pages 230. The method 300 may also include identifying the future page references 220 based on a relationship between the future page references 220 and the not-present page 230, 230a. The relationship may include a page navigation map 260 between a parent page 230 and one or more child pages 230. The page navigation map 260 may be a connection of related use of the parent page 230 and previous uses of the child page 230. In some examples, identifying the future page references 220 includes identifying at least one additional future page reference 220 in at least one instruction 210 associated with an identified future page reference 220. The method 300 may also include ceasing emulation of the continued execution of the instruction stream of instructions 210 by the emulator 250 when the not-present page 230, 230a has been delivered to the migration target host 110, 110b. The not-present page 230, 230a may be returned by the not-present page return 244 from the migration source host 110, 110a. The method 300 may further include continuing execution of the instruction stream of instructions 210 of the guest virtual machine 200 on the migration target host 110, 110b when the not-present page 230, 230a is resident on the migration target host 110, 110b. Identifying future page references 220 from the emulated continued execution of the instruction stream of the instructions 210 of the method 300 further may include identifying a future page address 232 of the identified future page references 220.

Figure 4:
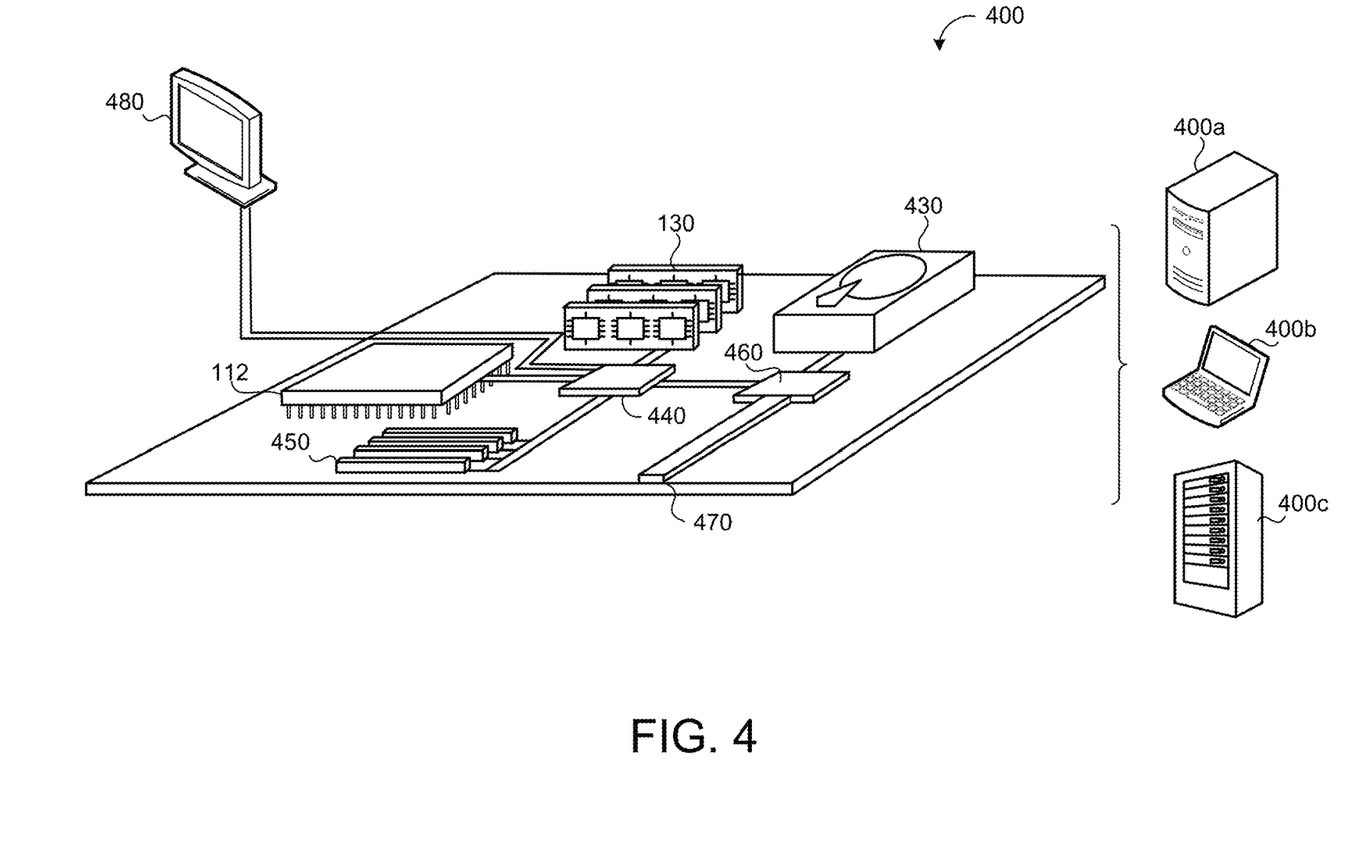
FIG. 4 is a schematic view of an example computing device that may be a host used to implement the systems and methods described in this document.

FIG. 4 is schematic view of an example computing device 400 that may be a host 110 used to implement the systems and methods described in this document. The computing device 400 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 400 includes data processing hardware 112, memory 130, a storage device 430, a high-speed interface/controller 440 connecting to the memory 130 and high-speed expansion ports 450, and a low speed interface/controller 460 connecting to low speed bus 470 and storage device 430. Each of the components 112, 130, 430, 440, 450, and 460, are interconnected using various busses, and may be mounted on a common motherboard or in other manners as appropriate. The processor 112 can process instructions for execution within the computing device 400, including instructions stored in the memory 130 or on the storage device 430 to display graphical information for a graphical user interface (GUI) on an external input/output device, such as display 480 coupled to high speed interface 440. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 130 stores information non-transitorily within the computing device 400. The memory 130 may be a computer-readable medium, a volatile memory unit(s), or non-volatile memory unit(s). The non-transitory memory 130 may be physical devices used to store programs (e.g., sequences of instructions) or data (e.g., program state information) on a temporary or permanent basis for use by the computing device 400. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 430 is capable of providing mass storage for the computing device 400. In some implementations, the storage device 430 is a computer-readable medium. In various different implementations, the storage device 430 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 130, the storage device 430, or memory on processor 112.

The high speed controller 440 manages bandwidth-intensive operations for the computing device 400, while the low speed controller 460 manages lower bandwidth-intensive operations. Such allocation of duties is exemplary only. In some implementations, the high-speed controller 440 is coupled to the memory 130, the display 480 (e.g., through a graphics processor or accelerator), and to the high-speed expansion ports 450, which may accept various expansion cards (not shown). In some implementations, the low-speed controller 460 is coupled to the storage device 430 and low-speed expansion port 470. The low-speed expansion port 470, which may include various communication ports (e.g., USB, Bluetooth, Ethernet, wireless Ethernet), may be coupled to one or more input/output devices, such as a keyboard, a pointing device, a scanner, or a networking device, such as a switch or router, e.g., through a network adapter.

The computing device 400 may be implemented in a number of different forms, as shown in the figure. For example, it may be implemented as a standard server 400a or multiple times in a group of such servers 400a, as a laptop computer 400b, or as part of a rack server system 400c. Various implementations of the systems and techniques described here can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

What is claimed is:

1. A method comprising:
   determining, by a migration target host, that a guest virtual machine being post-copy migrated from a migration source host to the migration target host and executed on the migration target host encounters a page fault for a page reference in an instruction stream of the guest virtual machine to a not-present page;
   requesting, by the migration target host, the not-present page from the migration source host for loading on the migration target host;
   emulating, on an emulator executing on or in communication with the migration target host, continued execution of the instruction stream of the guest virtual machine;
   identifying, by the emulator, future page references to future pages from the emulated continued execution of the instruction stream;
   examining, by the emulator, at least one instruction in the instruction stream associated with one of the identified future page references to identify at least one additional future page reference; and
   requesting, by the migration target host, the future pages corresponding to the identified future page references and the at least one identified additional future page reference from the migration source host and the not-present page request for the not-present page.

2. The method of claim 1, wherein requesting the future pages corresponding to the identified future page references from the migration source host is in parallel with requesting the not-present page request for the not-present page, so as to prefetch the future pages to the migration target host while loading the not-present page on the migration target host.

3. The method of claim 1, further comprising, while emulating the continued execution of the instruction stream of the guest virtual machine, setting aside instructions that are dependent on loaded values of the not-present page, allowing the emulator to identify future page references beyond future page faults.

4. The method of claim 1, wherein the migration target host comprises:
   one or more computing devices; and
   one or more memory hosts in communication with the one or more computing devices, the one or more memory hosts storing pages.

5. The method of claim 1, further comprising identifying the future page references based on a relationship between the future page references and the not-present page.

6. The method of claim 5, where the relationship comprises a page navigation map between a parent page and one or more child pages.

7. The method of claim 1, further comprising ceasing emulation of the continued execution of the instruction stream by the emulator when the not-present page has been delivered to the migration target host.

8. The method of claim 7, further comprising continuing execution of the instruction stream of the guest virtual machine on the migration target host when the not-present page is resident on the migration target host.

9. The method of claim 1, wherein identifying future page references from the emulated continued execution of the instruction stream further comprises identifying a future page address of the identified future page references.

10. A migration target host comprising:
    data processing hardware; and
    memory hardware in communication with the data processing hardware, the memory hardware storing instructions that when executed on the data processing hardware cause the data processing hardware to perform operations comprising:
    determining that a guest virtual machine being post-copy migrated from a migration source host to the memory hardware and executed on the data processing hardware encounters a page fault for a page reference in an instruction stream of the guest virtual machine to a not-present page;
    requesting the not-present page from the migration source host for loading on the memory hardware;
    emulating, on an emulator executing on the data processing hardware or in communication with the migration target host, continued execution of the instruction stream of the guest virtual machine;
    identifying, by the emulator, future page references to future pages from the emulated continued execution of the instruction stream;

examining, by the emulator, at least one instruction in the instruction stream associated with one of the identified future page references to identify at least one additional future page reference; and requesting the future pages corresponding to the identified future page references and the at least one identified additional future page reference from the migration source host and the not-present page request for the not-present page.

11. The migration target host of claim 10, wherein requesting the future pages corresponding to the identified future page references from the migration source host is in parallel with requesting the not-present page request for the not-present page, so as to prefetch the future pages to the migration target host while loading the not-present page on the migration target host.

12. The migration target host of claim 10, wherein the operations further comprise, while emulating the continued execution of the instruction stream of the guest virtual machine, setting aside instructions that are dependent on loaded values of the not-present page, allowing the emulator to identify future page references beyond future page faults.

13. The migration target host of claim 10, wherein the operations further comprise requesting the identified future page references from the migration source host as the future page references are identified.

14. The migration target host of claim 10, wherein the operations further comprise identifying the future page references based on a relationship between the future page reference and the not-present page.

15. The migration target host of claim 14, where the relationship comprises a page navigation map between a parent page and one or more child pages.

16. The migration target host of claim 10, wherein the operations further comprise ceasing emulation of the continued execution of the instruction stream by the emulator when the not-present page has been delivered to the memory hardware of the migration target host.

17. The migration target host of claim 16, wherein the operations further comprise continuing execution of the instruction stream of the guest virtual machine when the not-present page is resident on the memory hardware of the migration target host.

18. The migration target host of claim 10, wherein identifying future page references from the emulated continued execution of the instruction stream further comprises identifying a future page address of the identified future page references.

* * * * *